United States Patent [19]

Wiemers et al.

[11] Patent Number: 5,145,256
[45] Date of Patent: Sep. 8, 1992

[54] APPARATUS FOR TREATING EFFLUENTS

[75] Inventors: Reginald A. Wiemers, Denver, Colo.; Alfred R. Simmons, Los Angeles, Calif.

[73] Assignee: Environmental Equipment Corporation, Denver, Colo.

[21] Appl. No.: 516,759

[22] Filed: Apr. 30, 1990

[51] Int. Cl.$^5$ .............................................. B01F 5/06
[52] U.S. Cl. ..................................... 366/336; 366/337; 366/338; 366/340; 137/808; 137/811; 210/252; 210/767
[58] Field of Search ............... 366/336, 337, 338, 339, 366/340, 341; 137/808, 811; 138/37, 155; 210/252, 767

[56] References Cited

U.S. PATENT DOCUMENTS

| | | | |
|---|---|---|---|
| 2,852,091 | 9/1958 | Boudreaux et al. | 210/512.1 |
| 2,941,783 | 6/1960 | Stinson | 210/512.1 |
| 3,929,633 | 12/1975 | Visman et al. | 210/209 |
| 4,085,462 | 4/1978 | Booy | 366/340 |
| 4,164,375 | 8/1979 | Allen | 366/337 |
| 4,174,278 | 11/1979 | Tramier et al. | 209/5 |
| 4,313,680 | 2/1982 | Honnen | 366/340 |
| 4,408,892 | 10/1983 | Combes et al. | 366/340 |
| 4,461,579 | 7/1984 | McCallum | 366/337 |
| 4,756,823 | 7/1988 | O'Neill et al. | 209/5 |
| 4,758,098 | 7/1988 | Meyer | 366/337 |
| 4,758,332 | 7/1988 | Capes et al. | 209/5 |
| 4,786,185 | 11/1988 | Knief | 366/340 |
| 4,824,614 | 4/1989 | Jones | 366/337 |
| 4,861,165 | 8/1989 | Fredriksson et al. | 366/336 |

Primary Examiner—Robert A. Dawson
Assistant Examiner—David Reifsnyder
Attorney, Agent, or Firm—Harold A. Burdick

[57] ABSTRACT

An apparatus and method for treating effluents is disclosed for selective solids control and/or dewatering of effluents, for example drilling fluids (or mud), slurries or sludges, or other clean up involving solids removal from a hydraulic system where flocculation would be employed. The apparatus is compact and portable for ease of on-site delivery and hookup and includes a plurality of mixers for mixing polymer materials with water and/or the effluent, a plurality of pumps for controlling the flow of effluents, water and mixed liquids, and a plurality of conveniently located valves and pump controls for control of the various functions of the apparatus from a centrally located control panel. An improved mixing device is provided for blending of shear-sensitive fluids which includes multi-port injection sites and a series of geometrical flow altering elements. A device for wetting dry particulate material in a liquid feed stream is provided having a cylindrical funnel eductor and a cyclonic dispersal eductor.

16 Claims, 9 Drawing Sheets

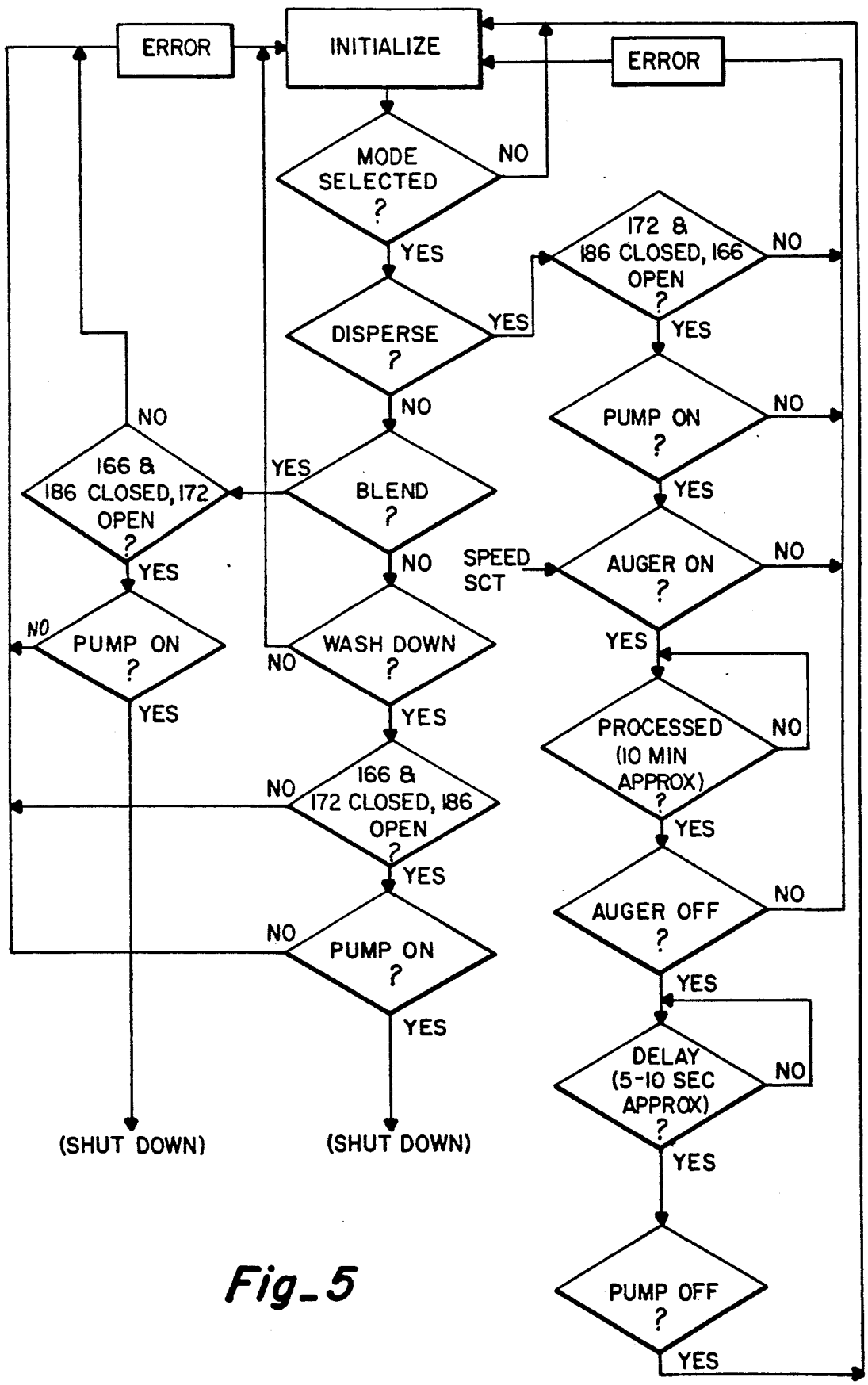
Fig_5

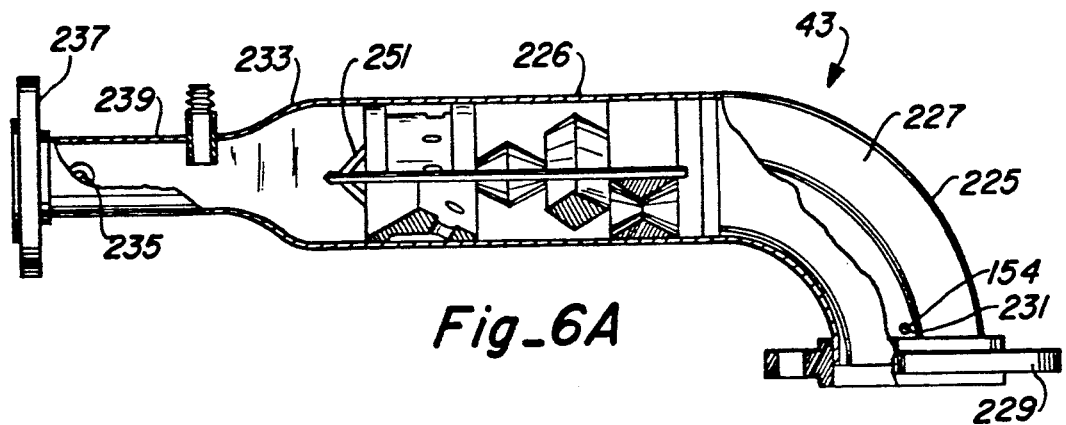
Fig_6A
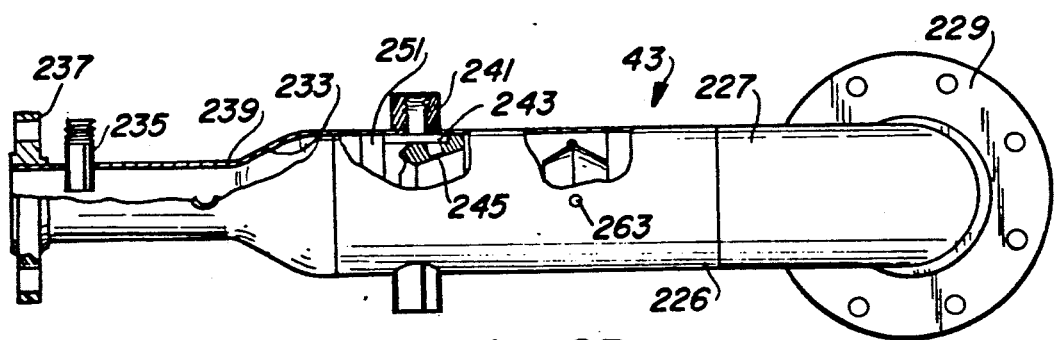
Fig_6B
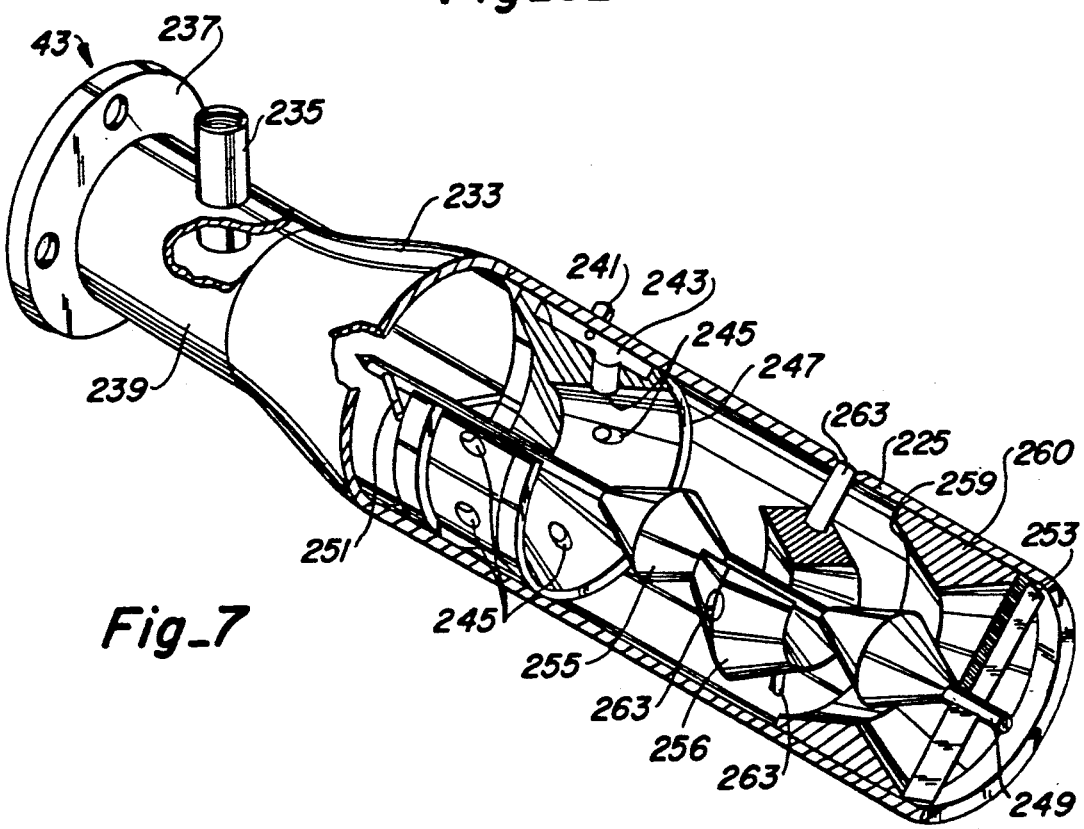
Fig_7

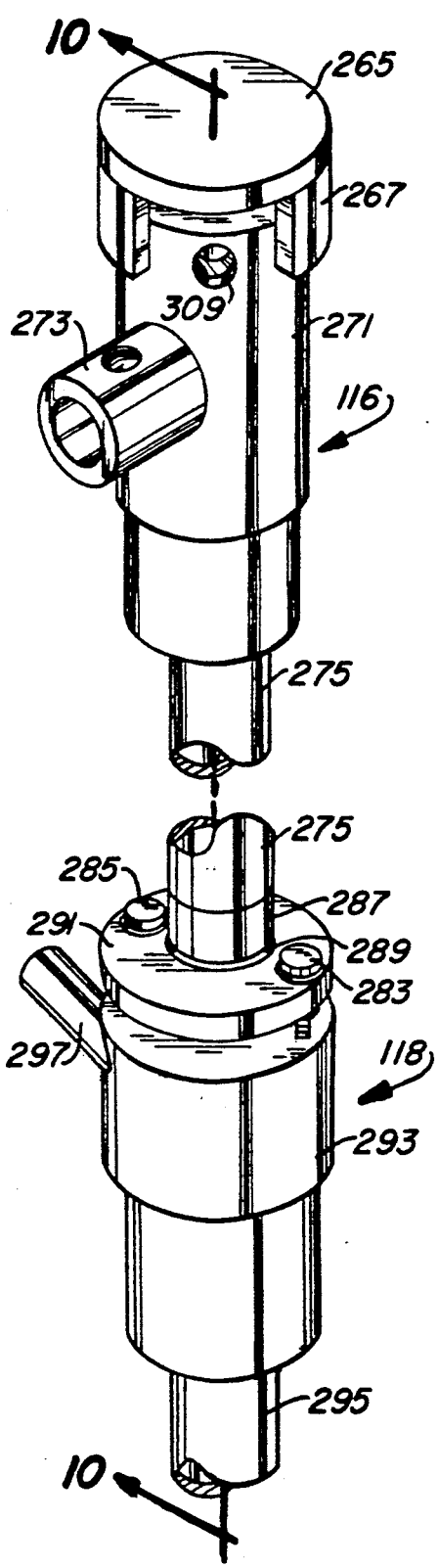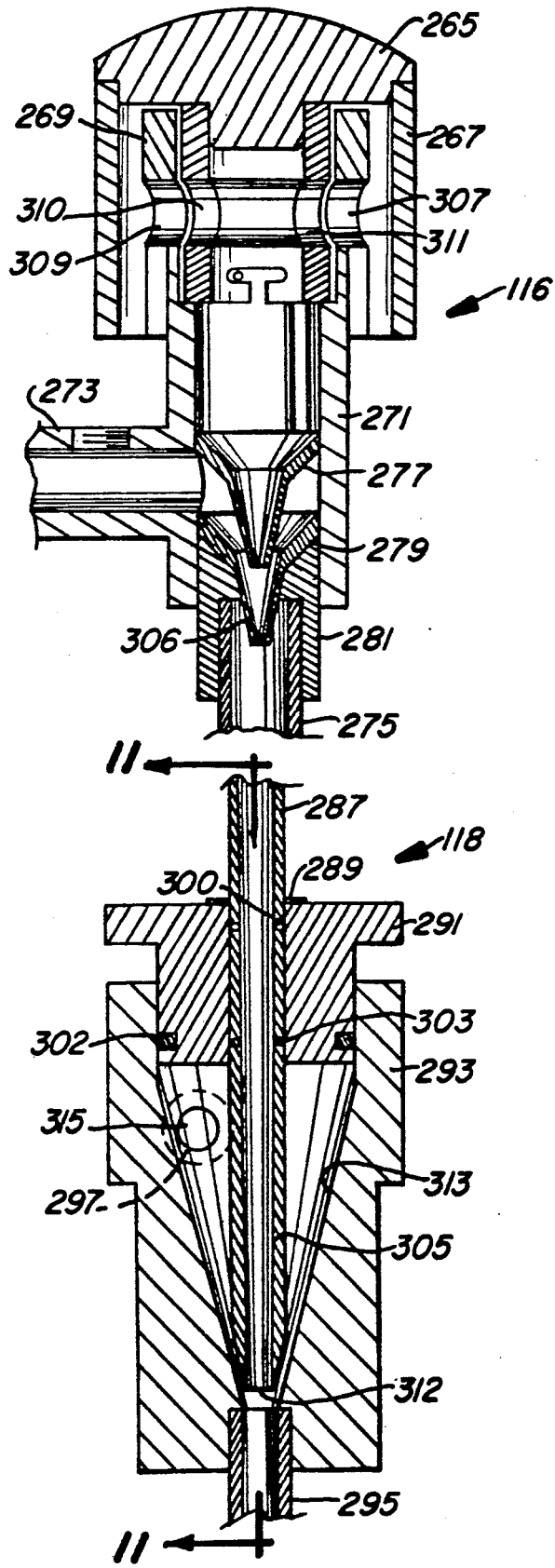
Fig_9
Fig_10

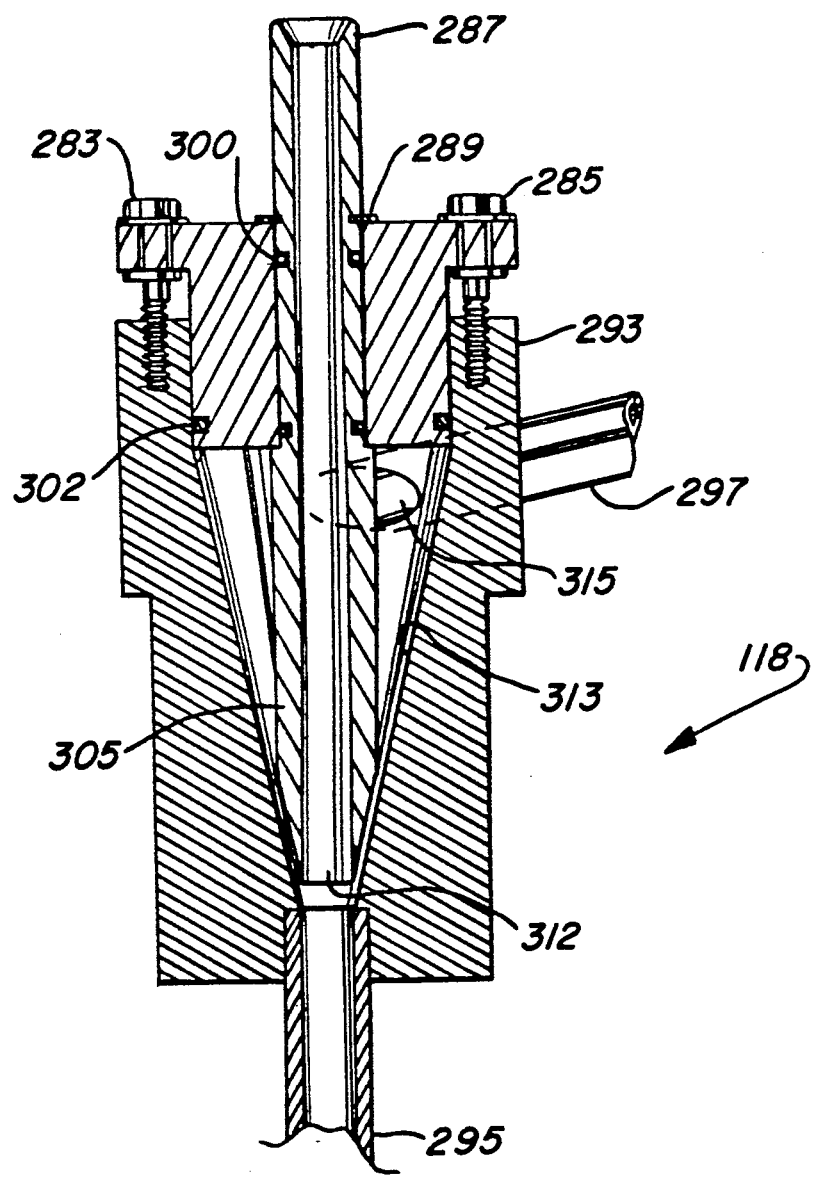
Fig_11

APPARATUS FOR TREATING EFFLUENTS

FIELD OF THE INVENTION

This invention relates to apparatus and methods for treating effluents, and, more particularly, relates to apparatus and methods for treating effluents such as drilling fluids, sludge, slurries and the like to prepare the effluent for removal of particulate matter therefrom.

BACKGROUND OF THE INVENTION

It is known that solids, particularly fine and ultra-fine solids, can cause a variety of problems if allowed to accumulate in various effluent fluids, for example drilling fluid (or muds), sludges and/or slurries. It is also known that some solids can be controlled and/or removed from fluids, at least to a limited degree, using equipment such as (for drilling fluids and muds for example) shale shakers, desanders, desilters, and centrifuges. This type of equipment is known to do an adequate job of removing solids greater in size than approximately three to seven microns. Below this particle size the effectiveness of such mechanical equipment is greatly reduced.

However, if allowed to continue to accumulate, solids smaller than approximately three to seven microns can provide difficulty in a variety of operations. For example, when such solids are allowed to accumulate in drilling muds rheological control problems, decrease in penetration rate and formation damage can occur. In addition, damage to sensitive machinery such as bits and the like (from failure of adequate lubrication) may result. For removal of such fine and/or ultrafine solids it has been recommended that certain chemicals, specifically polymeric coagulants and flocculants, be mixed with the effluent.

While various methods and apparatus for separating solids from aqueous suspension have been heretofore known and/or utilized (see for example U.S. Pat. Nos. 3,929,633, 2,941,783 and 2,852,091) and while devices and methods have been previously suggested and/or utilized for separating particles from fluids in general (see for example U.S. Pat. Nos. 4,756,823, 4,174,278, 4,431,548, 4,758,332, 4,692,237, 4,539,099 and 4,511,479), such apparatus and methods heretofore known have not provided an integrated system for the makeup of dry polymer, polymer blending, polymer injection and mixing with the effluent, floc forming, and effluent preconditioning and chemical preparation in a relatively compact and portable structure with a centralized control system.

With regard to polymer flocculation, it is known that the long chain polymers utilized for water treatment processes are shear-sensitive, and thus must be introduced into the effluents while avoiding destruction of the shear-sensitive floc formed therewith. However, thorough blending is also required of the polymer material with the effluent in order to achieve adequate floc formation.

It is also known that, when utilizing polymers in dry form as a coagulant, flocculent or the like (for example products produced by Allied Colloids Company such as the trademark products Percols 351, E-24, 155, 156, 721, 728, 753 and 788N), preparation of a concentrated stock solution is desirable to assure proper activation of the polymer in its liquid phase (for example water). It would be desirable therefore, during this polymer dispersion process, for the polymer particles utilized to be prewetted to decrease the dispersion time and prevent the formation of lumps (known as fisheyes) of the polymer material which dissolve very slowly, if at all, due to formation on the outer surface of such lumps of a highly viscous gel which resists passage of liquid necessary for further wetting of the polymer.

While the need in various water purification processes for gentle but complete blending of polymers with effluents and for adequate dispersal of polymers in their aqueous phase is recognized, apparatus for achieving such goals have not always proved effective, and further improvement therein could still be utilized.

SUMMARY OF THE INVENTION

This invention provides an apparatus and method for treating effluent to enhance removal of selected matter therefrom, the apparatus including a preparation and holding section including an outlet for selective preparation and output of material for treating the effluent, and a mixer for mixing the treating material with the effluent. The mixer includes an inlet for receiving the effluent therethrough, an outlet for passage of the mixed effluent and treating material therethrough, and at least a first port for receiving the treating material therethrough. A first pump having controls for selective movement of the treating material between the outlet of the preparation and holding portion and the first port of the mixer, and second pump having controls for selective movement of the effluent and the mixed effluent and treating material through the mixer are provided, and a plurality of valves each having a valve control for selectively directing movement of fluid in and to said preparation and holding section and directing movement of treating material from said preparation and holding section are positioned adjacent to a centralized control positioning structure having the various controls of the pumps and valves thereat. A mounting skid for transportably mounting the apparatus thereon is also provided.

A device and method for mixing shear-sensitive fluids (including an effluent and a treating material such as a polymer) is provided by this invention, the device including a housing having an inlet and an outlet for passage of effluent therethrough, and an input port for receiving the treating material. A plurality of flow altering elements are positioned in the housing adjacent to the input port and between the inlet and outlet, the flow altering elements being configured for repeatedly altering the flow of the shear-sensitive fluid to induce blending of the effluent with the treating material while limiting back pressure in the housing.

The housing may, for example, be a pipe, and the flow altering elements include first and second transverse flow dividers having a mounting rod connected therebetween, a flow restricting element mounted to the inner wall of the pipe at one face thereof and having a manifold defined between the face and the inner wall of the pipe in communication with the input port, the manifold having a plurality of injection ports opening therefrom into the pipe, a plurality of cones mounted on the mounting rod each having an upstream facing side which meets the mounting rod at a selected angle, and a radially configured flow divider positioned in the pipe between the inlet and the outlet. A second flow restricting means may also be included.

A device and method for dispersing particles in a liquid (for example for dispersing polymer granules, or particles, in water in preparation for injection thereof into the effluent) is provided by this invention, the device including a particle distributing and separating portion for distributing and separating particles in an air flow stream, and a flow inducing and conducting portion connected with the particle distributing and separating portion for inducing the air flow through the particle distributing and separating portion and for spirally conducting a liquid flow stream through the flow inducing and conducting portion, the air flow stream having the particles therein being tangentially introduced into the spirally moving liquid flow stream at one part of the flow inducing and conducting portion.

The dispersing device may include an air funnel having an outlet for directing an air flow therethrough, a particle funnel for receiving the particles and having the outlet of the air funnel positioned adjacent thereto, the particle funnel having an outlet, an air flow control cap for controlling air flow to the air funnel, a housing having an inner wall defining a cone with an outlet defined therein at the bottom part of the cone, and a liquid feed stem opening into an upper part of the cone at a position so that liquid entering the cone through the feed stem is spirally directed in the cone toward the outlet. A nozzle is connected with the outlet of the particle funnel and having a port positioned adjacent to the bottom part of the cone.

It is therefore an object of this invention to provide an improved apparatus and method for treating effluent to enhance removal of selected matter therefrom.

It is another object of this invention to provide an improved apparatus for treating effluent which includes a portion for preparation and holding of treating materials, a mixer for mixing the treating materials and the effluent, a plurality of pumps for movement of the effluent and/or the treating materials in the apparatus, a plurality of valves for selectively directing movement of fluid through the apparatus, a centralized control structure having the various controls for the pumps and valves positioned thereat, and a mounting structure for transportably mounting the apparatus thereon.

It is still another object of this invention to provide an improved device and method for mixing shear-sensitive fluids which include an effluent and treating material, for example a polymer.

It is another object of this invention to provide a device for mixing shear-sensitive fluids which includes a housing having an input port for receiving the treating material therethrough and an inlet and an outlet for passage therethrough of the effluent, and a plurality of flow altering elements positioned in the housing adjacent to the input port and between the inlet and the outlet and which are configured for repeatedly altering the flow of the shear-sensitive fluid to induce blending of the effluent with the treating material while limiting back pressure in the housing.

It is still another object of this invention to provide a device for mixing shear-sensitive fluids which includes a pipe having an inner wall and an input port for receiving polymeric treating materials, first and second transverse flow dividers mounted to the inner wall of the pipe and having a mounting rod maintained therebetween, flow restricting means mounted with the inner wall of the pipe at one face thereof and having a manifold defined between the face and the inner wall of the pipe in communication with the input port of the pipe, the manifold including the plurality of injection ports opening therefrom into the pipe, a plurality of flow altering elements mounted on the mounting rod each having an upstream face forming a cone meeting the mounting rod at a selected angle, and a radially configured flow divider positioned in the pipe between the inlet and the outlet.

It is still another object of this invention to provide a device for dispensing particles in a liquid which includes a particle distributing and separating portion for distributing and separating the particles in an air flow stream, and a flow inducing and conducting portion connected with the particle distributing and separating portion for inducing the air flow through the particle distributing and separating portion and for spirally conducting a liquid flow stream through the flow inducing and conducting portion.

It is yet another object of this invention to provide a device for dispersing substantially dry particles in a liquid which includes adjacent air and particle funnels, an air flow control cap for controlling air flow to the air funnel, a housing having an inner wall defining a cone and an outlet therein at the bottom part of the cone and having a liquid feed stem opening into an upper part of the cone at a position so that liquid entering the cone through the feed stem is spirally conducted in the cone toward the outlet, and a nozzle connected with the outlet of the particle funnel and having a port positioned adjacent to the bottom part of the cone.

It is yet another object of this invention to provide an improved method for treating effluent to enhance removal of selected matter therefrom which includes the steps of introducing flowing effluent into a housing having an inner wall and an outlet, dividing flowing effluent and diverting the divided flow toward the inner wall, introducing the treating material into the housing downstream of the divided flow, and positioning a plurality of flow altering elements in the housing to alter the flow of the effluent and the treating materials so that the flow velocity is altered at different positions in the housing, the flow altering elements being configured so that some radial movement of the flow is introduced while limiting back pressure in the housing.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 5 is a flow chart illustrating operational control of the polymer dispersal and blending system employed in the apparatus of this invention;

FIGS. 6A and 6B are partial sectional illustrations of the device for mixing effluents with injected materials of this invention;

FIG. 7 is a partial sectional view of the mixer illustrated in FIGS. 6A and 6B further illustrating the geometrical internal flow altering elements;

FIG. 9 is a perspective view of the polymer dispersing device of this invention;

FIG. 10 is a sectional view taken through section lines 10—10 of FIG. 9; and

FIG. 11 is a sectional view taken through section lines 11—11 of FIG. 10.

DESCRIPTION OF THE INVENTION

Figure 1:
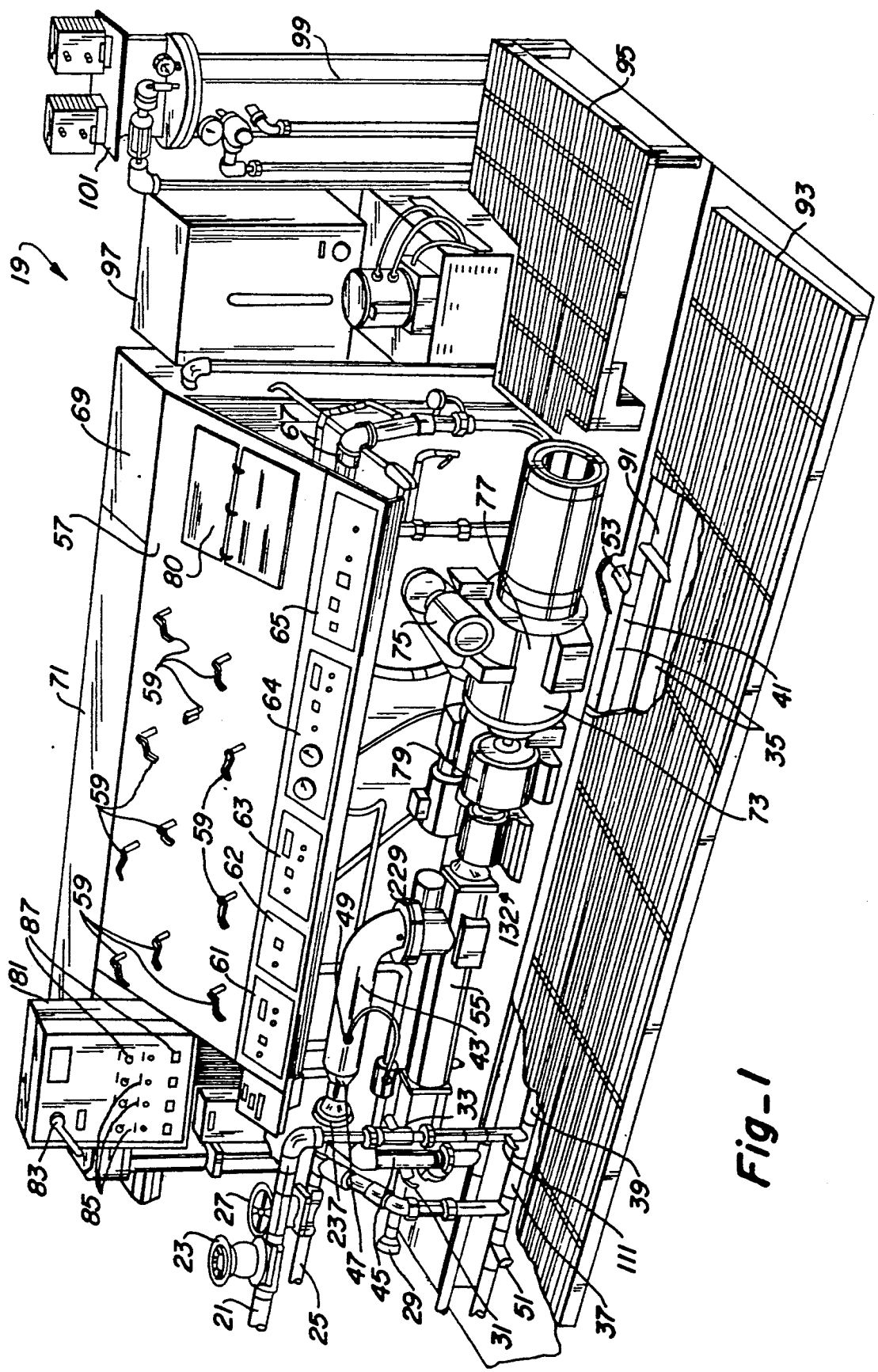
FIG. 1 is a perspective view of the apparatus of this invention.

FIG. 1 illustrates apparatus 19 of this invention, including many of the modular components thereof, for preparation of effluents to enhance removal of selected matter therefrom. In particular, the unit illustrated was designed for treatment of drilling muds (for example to control mud weight and/or dewater the mud), it being understood that the invention can be utilized for other effluent treatment processes. Apparatus 19 includes drilling fluid, or mud, input conduit, or line, 21 having valve 23 thereat (for example a diaphragm valve) and infeed line 25, a conduit for supply of dilution liquid (for example water, previously treated fluid from a holding tank or the like) and having dilution valve 27 thereat (again, for example, a diaphragm valve). Output line 29 directs the treated effluent to follow-on treating stages, for example providing output of the chemically enhanced and flocculated drilling mud for dewatering at a centrifuge stage. Outlet spigot 31 is provided as a floc formation sampling point and in-line volume flow meter 33 may be provided in mud line 21.

Chemical preparation line, or conduit, 35 is connected with line 25 and line 21 and includes static in-line mixers 37, 39 and 41 therein. Mixer, or turbulator, 43 is connected at its input with output line 45 of chemical preparation line 35 and includes first and second polymer injection ports 47 and 49, respectively. Acid injection port 51 and coagulant injection port 53 may be provided for chemical enhancement of drilling mud in chemical preparation line 35. Primary floc pump 55 is connected between the outlet from mixer 43 and effluent output line 29.

Control panel 57, having a plurality of valve controls 59 and control modules 61, 62, 63, 64, and 65, is provided mounted with the primary piping system 67 (discussed in more detail hereinafter) and mixing tank 69 and holding tank 71. Operator's manual 80 is mounted directly to control panel 57 for facilitating operator training and guidance. Drive system 73 for the main floc pump 55 includes drive motor 75 for speed control of variable speed drive unit 77 and couplings 79, all arranged with pump 55 in a conventional, pull through pumping system.

Main power supply input housing 81 includes system on/off control 83, a plurality of off-skid controls for remote equipment 85 and light controls 87 for the apparatus when incorporating an overall housing such as a rear wall, shed roof and/or complete enclosure or the like (not shown). The entire system is mounted on skid 91 and is relatively compact and portable (by trailerizing, containerizing or the like). Catwalk grills 93 and 95 are mountable with skid 91 to provide dry and ready access to the apparatus controls and control panel. Polymer preparation system 97 is provided on skid as are polymer blender 99 and chemical preparation pumps and controls 101.

Apparatus 19, as illustrated in FIG. 1, is approximately 60 inches high, 96 inches wide and 166 inches long and has a weight of approximately 5800 pounds (dry). Mixing tank 69 has a capacity of approximately 250 gallons while holding tank 71 has a capacity of approximately 500 gallons, and each may be made of treated steel or other suitable material. The auger in system 97 may be of conventional variety, although a precision machined stainless steel auger (controlled as hereinafter set forth) has been provided. The feeder unit associated with polymer preparation system 97 is a volumetric feeder which is speed-controlled through an SCR variable drive unit (not shown).

Line 25 is a 2 inch NPT, schedule 40, steel line, as are input line 21 and output line 29. The electrical hook-ups are conventional, utilizing, for example, a primary 480 volt AC source and a secondary 120 volt AC source (22 amps).

The primary power input includes a conventional circuit breaker with panel mounted disconnect and reset at housing 81. Secondary power protection is provided by a main fuse and a plurality of secondary fuses at major apparatus components, and all pump motors (described hereinafter) are protected by individual motor starters and automatic reset overload units. All pumps hereinafter set forth are protected against overpressure or dry-running by means of conventional automatic shutdown pressure switches which are integral to the piping system illustrated in FIG. 3.

All piping may be steel, cast, or, in some applications, PVC. Catwalk decking 93 and 95 are made of an anti-skid reinforced fiberglass for high strength and corrosion resistance.

Variable speed pump 55 is preferably a beltless pump providing ease of maintenance. Off-skid equipment controls 85 may be provided, for example, for use with pit pumps, catch tank pumps, conveyors and the like.

Figure 2:
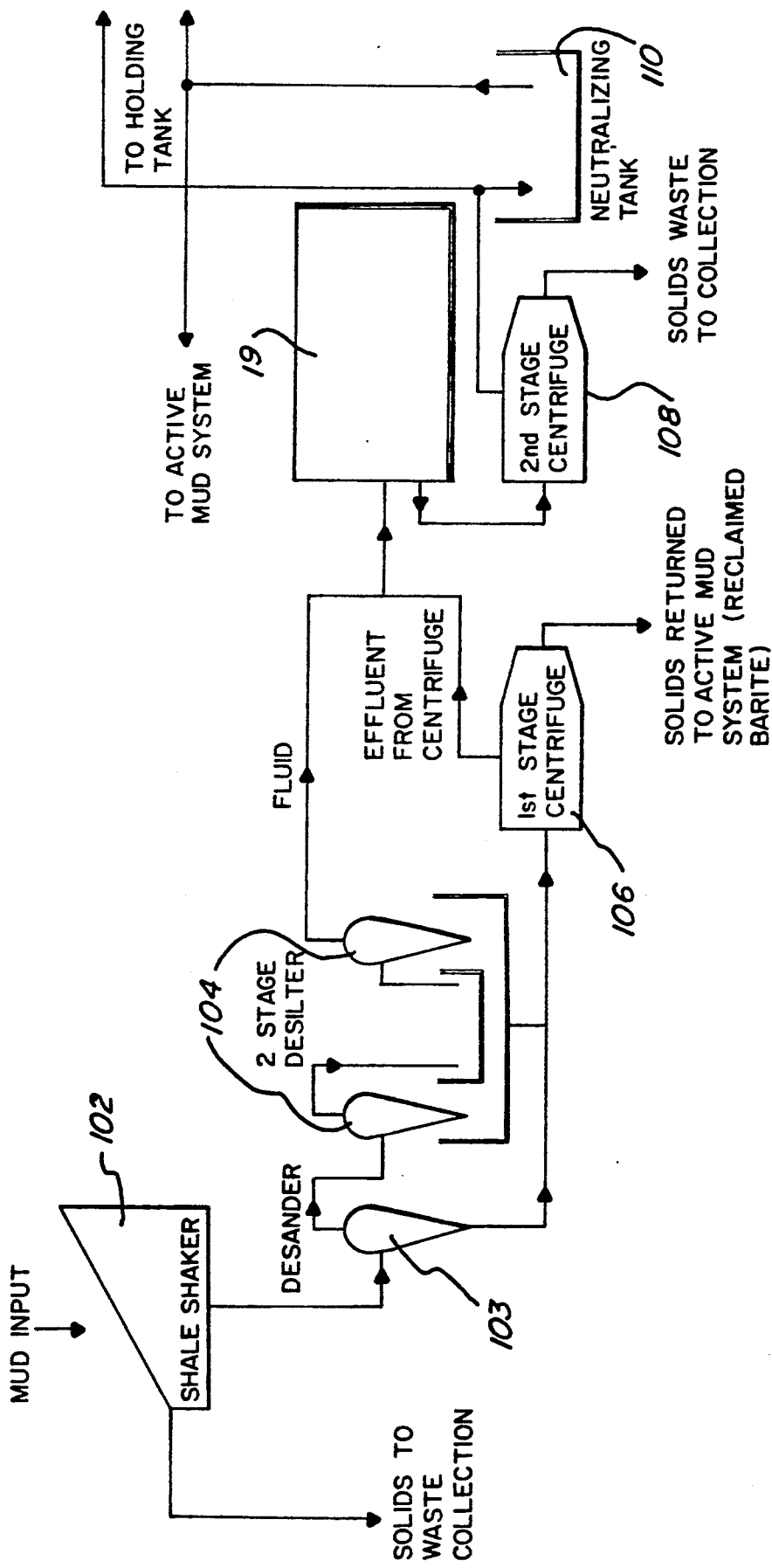
FIG. 2 is a flow diagram illustrating use of the apparatus in a system for effluent conditioning.

FIG. 2 illustrates use of apparatus 19 of this invention in an overall system for treatment of drilling muds utilizing drill solids separating equipment. Drilling mud returned from the well site is initially input at fine screen shale shaker 102 to remove drilling solids larger than 175 to 250 microns, depending on the mesh size of the shale shaker. Small amounts of colloidal barite, if present, may be removed with the solids. Smaller solids are returned to the active mud system. This equipment typically operates on the entire circulating volume of drilling fluids.

The collected solids are output to waste collection, the remaining output being provided at various mud cleaners, for example desander 103 and two-stage desilter 104. Such mud cleaners remove drilling solids larger than 75 to 105 microns depending on mud cleaner set up. Small amounts of oversized barite and some colloidal barite may be removed with the drilling solids. Smaller solids, including barite, are returned to the active mud system. This equipment also operates on the entire circulating volume.

While solids in the size range of five to 74 microns, approximately, including a major portion of the barite by volume, are not normally removed by the above processes, it is often desirable to remove low gravity solids and barite in the range of two to ten microns from the active mud system. This may be accomplished, at least to a degree, by first stage centrifuge 106. What remains thereafter are particles in the ultrafine size range (smaller than two to ten microns) which remain suspended in the drilling fluid.

Particles in the ultrafine size range can cause significant problems to the drilling industry. For example, for a given solids concentration, fines less than one micron are 11.7 times more detrimental to penetration rate than those clay solids that are larger than one micron (see A.S.M.E. Paper No. 77-PET68). In addition, ultrafines are prominent components of drilling fluids. Thirteen percent of the particles in bentonite slurry are smaller than one micron, eight percent of particles in bentonite slurry plus lignosulfonate dispersant are smaller than one micron, and six percent of particles in a bentonite slurry plus polymer are smaller than one micron.

Thus, fluids output from the second stage centrifuge are provided at apparatus 19 for flocculation (formation of the fines and ultrafines, down to the angstrom range, into clumps, or flocs, using polymers or the like) and other treatment. For example, where weighted mud is used (for example weighted with barite), first stage centrifuge 106 reclaims the barite and its effluent is transferred to a holding tank. Second stage centrifuge 108 is fed from this holding tank through apparatus 19 to chemically dewater the effluent mud. Using the second stage centrifuge in a dewatering mode makes it possible to economically separate the liquid from the solids. The output can then be transferred to neutralizing tank 110 for neutralization prior to adding it back to the active mud system or may be maintained in a holding tank.

Where unweighted mud is utilized, apparatus 19 is again utilized to enhance the drilling solids removal capabilities of a centrifuge by injection of polymer flocculants in advance of the feed line to the second stage centrifuge. Typically, when using this technique, the centrifuge effluent can be controlled at an economical rate and returned to the active mud system. This approach is highly cost-effective in some unweighted mud systems and lightly treated unweighted mud systems, and allows the centrifuge to operate at high volumes, enhancing the return of expensive chemicals and polymers to the active mud system.

The polymers generally utilized for such solids control are organic chemical substances made up of large molecules (typically of high molecular weight) formed by the union of large numbers of simple molecules (monomers) of carbon, hydrogen and oxygen, to which other elements such as chlorine or fluorine may be added. Where polymers are utilized for water treatment (typically referred to as polyelectrolytes), solids removal is aided by electrostatic attraction and agglomeration. The large molecule size of the polymers provides large numbers of charged sites that attract the suspended solids thereby forming sizable clumps, or flocs, which are more easily separated from the effluent.

The selection of a proper polymer blend to be used by apparatus 19 involves consideration of the characteristics of the effluent to be treated. This requires analysis of volume and concentration of both suspended ultrafines and the desired characteristics (weight, chemical makeup, etc.) of the drilling mud to be retained. Data for the selection process is generated through the chemical analysis of mud samples from the involved drill site (taken at mud sample point 111 in FIGS. 1 and 3). After this analysis, polymeric compounds can be selected for the mud processing desired using known analytical techniques (see Allied Colloids Co. publications "A Guide to Dewatering Drilling Fluids", and "PERCOL OSD Series Polymers", Siranco Company publication "Storage and Handling of Polymers", "Modern Solids Control: A Centrifuge Dewatering-Process Study" in the SPE Drilling Engineering Magazine (Sept. 1988, p. 315 et seq), and "Applied Drilling Engineering" (SPE, 1986, pp 41 through 75).

By judicious use of selected polymers and chemical treatment, the flocculation process prior to centrifuging allows expensive polymers and chemicals to be returned to the active mud system while lowering the cut point in the centrifuge. Apparatus 19 may be thus utilized to provide either selective solids control (returning the output to the active mud system) or dewatering (wherein clear water can be obtained). Where apparatus 19 is utilized, processed water will meet water quality control standards, thus providing water for disposal or secondary uses (for example injection into a disposal well, injection into the drilling casing annulus, disposal in sewer lines, or reuse in the active mud system if flocculating elements are first removed through minor chemical treatment).

Figure 3:
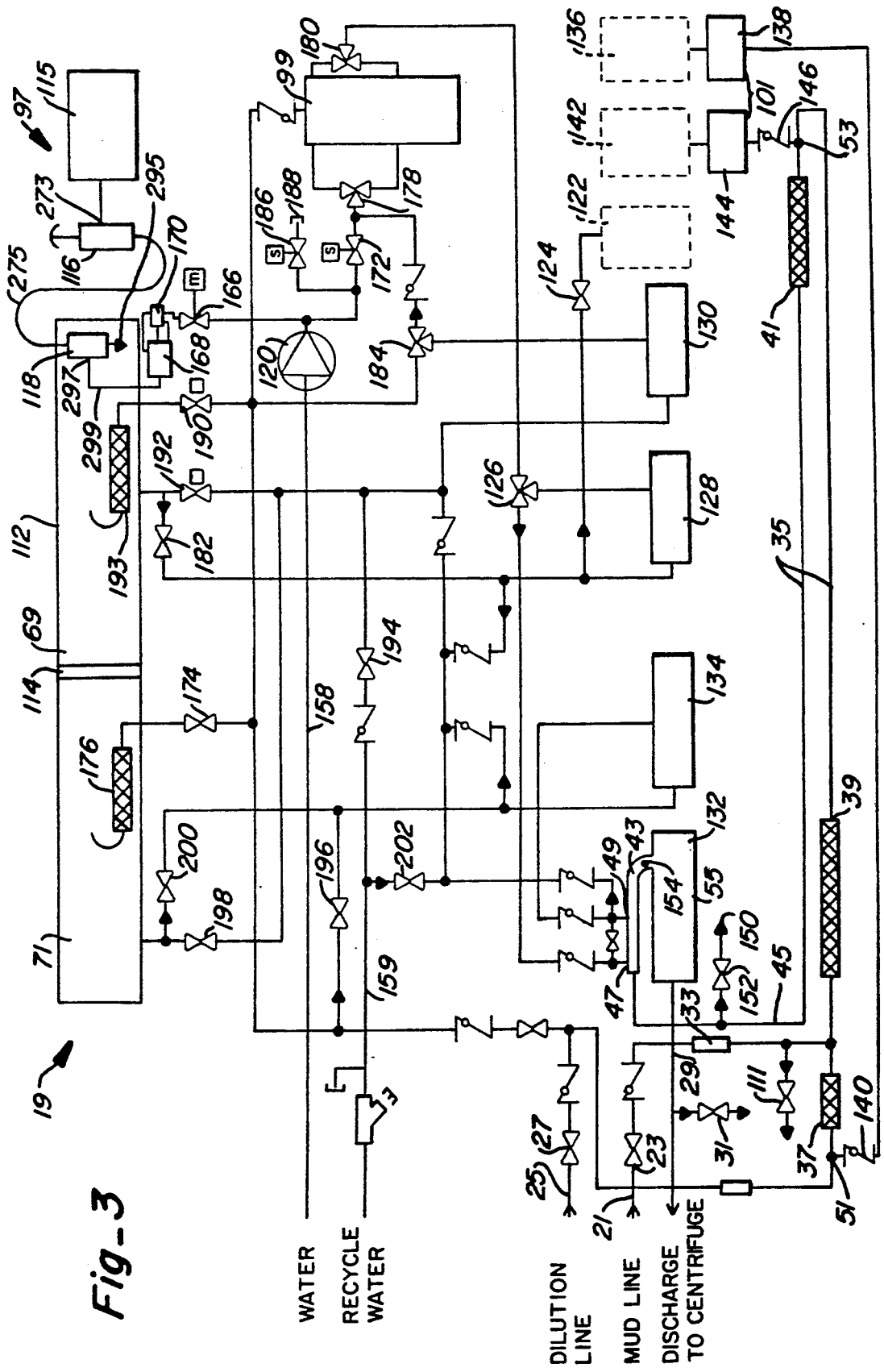
FIG. 3 is a schematic diagram illustrating the apparatus of this invention shown in FIG. 1.

Turning now to FIG. 3, wherein a schematic diagram illustrating apparatus 19 is provided with all piping for transporting the various fluid materials between elements being indicated by solid lines, modular tank 112 includes bulk head 114 for dividing the tank into mixing tank section 69 and holding tank section 71. Polymer preparation system 97 is connected to an automated drive polymer feed control system (as more fully set forth hereinafter) and includes substantially water-tight hopper/auger/feeder 115, funnel eductor 116, cyclonic dispersal eductor 118 and related controls 65 (illustrated in FIGS. 1 and 4).

Polymer blender 99 is connected with centrifugal water pump 120 and to liquid polymer supply container 122 through main valve 124 and three-way valve 126. Metering pump 128, progressive cavity transfer pump 130, main floc pump system 132, including progressive cavity type pump 55, and progressive cavity type injection pump 134 are provided for movement of the various fluids in the system (pumps 128, 55 and 134 are preferably all progressive cavity type pumps utilizing beltless variable speed drive).

Acid supply container 136 is connected with diaphragm type acid feed pump 138 and through backflow control valve 140 to injection port 51. Similarly, coagulant supply container 142 is connected through diaphragm type coagulant feed pump 144 through backflow control valve 146 to injection port 53.

Mixer, or turbulator, 43 is connected between line 45 and pump 55 after preconditioned mud sample point 150 provided through valve 152. Sample point 154 is provided at the outlet of mixer 43 for allowing removal of samples to test for proper blending before main floc pump system 132. While mixer 43 and main floc pump 55 as described herein are set up in a pull-through mode, it should be realized that mixer 43 could be arranged in a pipe configuration with pump 55 in a push-through mode.

Clean water, which is preferred for polymer makeup, is supplied to apparatus 19 through line 158 to centrifugal pump 120. Clean water is typically used in four different operations, although for some applications, recycled water supplied through line 159 may be utilized. When dispensing mode is set at mode selector switch 160 of control module 65, (FIG. 4) and after setting the desired polymer concentration by means of the polymer feed spaced regulator 162 of control unit 65, manual on/off control switch 164 initiates polymer dispersion (makeup of concentrated polymer solution from dry polymer granules or powder). As illustrated in FIG. 5, water supply to disperser eductor 118 is initiated by pump 120 and the opening of electrically controlled valve 166. Opening of valve 166 is sensed and a control sequence is initiated starting dry polymer feed auger 115, determining the amount of polymer fed into disperser eductor 118 through funnel eductor 116 under the control of speed control 162, sensing the adequacy of the water supply rate from pump 120, stopping the dry polymer feed after a predetermined processing time (approximately 10 minutes, but dependent on the size of mixing tank 69), and continuing the water flow to clear disperser eductor 118 (approximately 5 to 10 seconds) and thereafter stopping pump 120.

Water flow rate is controlled by flow regulator 168, polymer flow rate being precisely controlled, for example using an SCR drive associated with feeder/auger 115. Differential pressure sensor 170 is coupled to flow regulator 168 and monitors the proper flow conditions, cutting off water flow and polymer feed in the event of improper flow conditions thus terminating the mix, and if desired, setting off an audible alarm, warning light or the like.

Where blend mode is selected at selector switch 160 of control module 65, the operator then sets the desired concentration of liquid polymer by means of speed control 171 connected to metering pump 128. The metering pump then supplies liquid polymer to blender 99 through valves 124 and 126 where it is mixed with clean water provided by water pump 120 at a known flow rate through solenoid valve 172 thereby producing the desired concentration of makeup solution for storage at holding tank 71 through valve 174 and in-line mixer 176. Commonly-controlled valves 178 and 180 must be manually set for liquid polymer makeup before instituting the operation (commercial liquid polymers are typically more concentrated, four to eight percent active polymer, than the stock solution made of dry polymer material, usually less than four percent active polymer, and thus are more viscous, requiring different inlet porting to blender 99).

Where commonly-controlled valves 178 and 180 are set for blending of the stock solutions held in mixing tank 69, again after selection of the blending mode at selector switch 160 and after setting desired concentration by means of speed control 171 of metering pump 128, pump 128 supplies the concentrated makeup solution in mixing tank 69 to blender 99 through valve 182, metering pump 128, and valve 126 where it is mixed with clean water supplied by water pump 120 thereby producing the desired concentration of stock solution. The stock solution is sent to holding tank 71 through valve 174 and in line mixer 176. Water may also be supplied for washdown after selection of the washdown mode at selector switch 160 wherein solenoid valve 186 is activated thus providing clean water to manual hose valve 188 for washing purposes.

Apparatus 19 may include systems for preconditioning the drilling fluid effluent prior to flocculation, for example to lower the pH value by injection of acids or to enhance coagulation by the injection of various coagulants. To modify the pH characteristics of the effluent, acid pump 138 introduces acid into the effluent through injection port 51. To promote flocculation and further reduce the amount of polymer flocculents needed, coagulants can be injected utilizing injection pump 144. Static in-line mixers 37 and 41 are provided adjacent to the injection ports for blending of acids and/or coagulants prior to injection of the polymer solution into the effluent at mixer 43.

Figure 4:
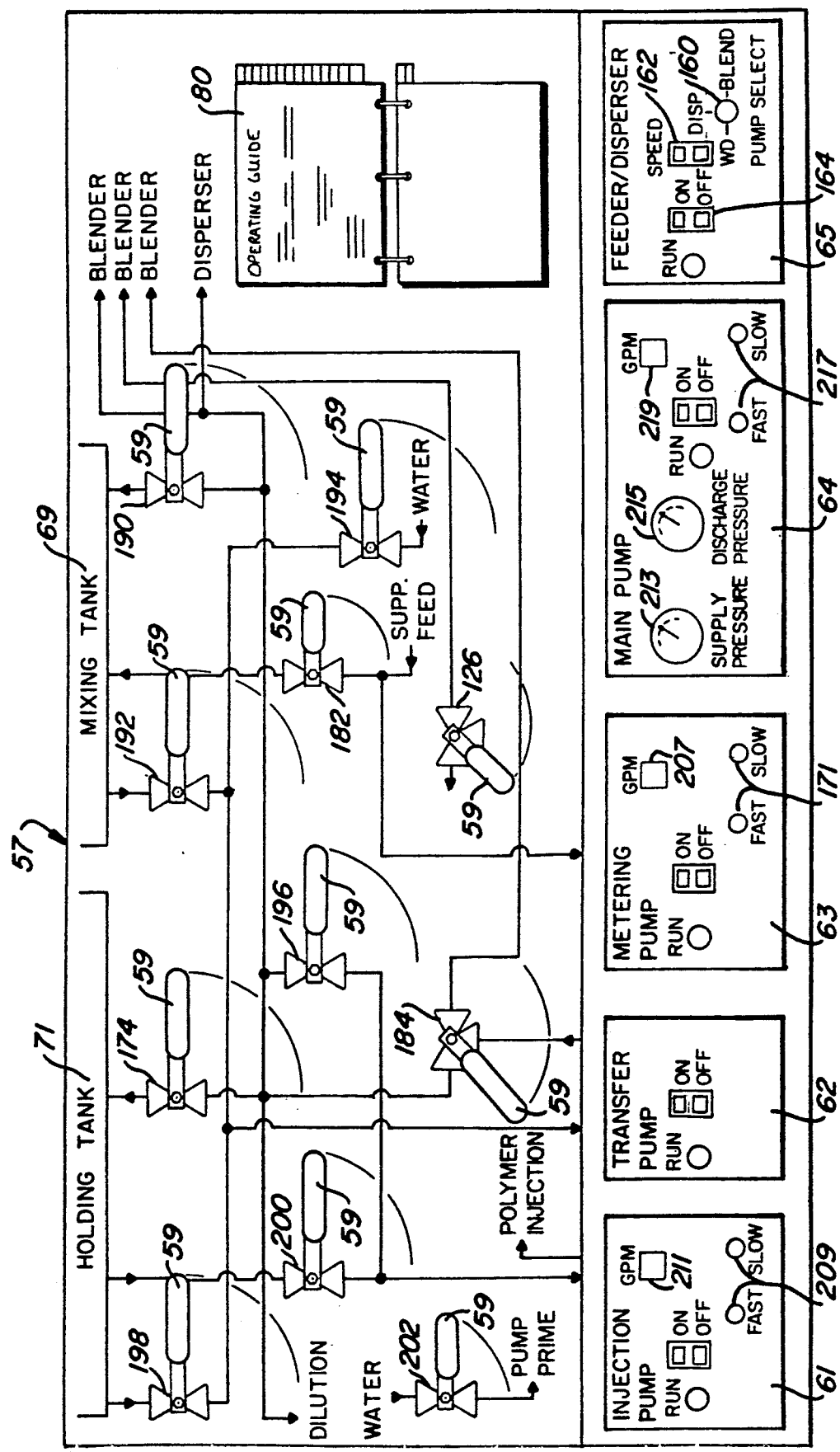
FIG. 4 is an illustration of the control panel of the apparatus illustrated in FIG. 1.

Overall processing of effluents provided by apparatus 19 can be illustrated with reference to FIGS. 3 and 4. For example, for initial dispersal of polymers, the dispensing mode is selected at switch 160 and thereafter all operations are controlled as set forth hereinbefore. All valves (particularly to and from mixing tank 69) which are controllable from control panel 57 should be closed (valves 174, 182, 190, 192, 194, 196, 198, 200 and 202), and three-way valves 184 and 126 may be set in either position (seven o'clock position of these valves relates generally to opening of lines between the related pumps and other elements while the five o'clock position relates generally to opening of lines between the related pumps and blender 99). For circulating (mixing) the concentrated solution from tank 69, transfer pump 130 is turned on at control module 62 and valves 190 and 192 are opened. Valve 184 is set to open the line between valve 190 and pump 130 and the concentrated solution is thus circulated and mixed through in-line mixer 193 (the transfer pump operates in a range between 25 to 40 psi depending on down-stream flow characteristics).

When blending from mixing tank 69 and transferring stock solution to holding tank 71, valves 182 and 174 are opened, and metering pump 128 is turned on and set for the desired output rate utilizing controls 171 monitored by rate indicator 207. The metering pump output range is from 0 gallons per minute to 10 gallons per minute with a maximum pressure of 50 psi. Selector switch 160 is set for blend mode.

For injection of the stock polymer solution held in holding tank 71 into mixer 43, valve 200 is opened and injection pump 134 is switched on at control module 61 of panel 57 with the injection rate being set at speed control switches 209 and monitored at meter 211. Main pump system 132 is turned on at control module 64 with the supply pressure and discharge pressure being monitored at gauges 213 and 215, respectively, the pump speed being controlled by switches 217 and monitored at meter 219. The injection pumping range is from 0 to 20 gallons per minute, with the setting being dependent upon proper flocculation checked at floc sample point 31. If, after reaching the top of the range of operation of the injection pump, it is found that flocculation must be further enhanced, injection of coagulants into the chemical treatment line is indicated. Further dilution of mud entering the system may be required and is accomplished by opening dilution line valve 27. Proper pH level must be maintained and acid added if necessary, the evaluation being accomplished by withdrawal of fluids at sample point 150 for example.

For blending of a stock solution from liquid polymer, valve 124 and valve 174 to holding tank 71 are opened and valve 126 is placed in the five o'clock position thus opening the line between blender 99 and metering pump 128. The metering pump is switched on after manual control valves 178 and 180 are set to liquid polymer blending and the metering pump is set at the desired output rate to ensure the desired blend.

Occasionally it may be desirable to recirculate the solution in the holding tank, for which purpose transfer pump 130 is turned on, valve 184 set in the seven o'- clock position to allow circulation between the transfer pump and holding tank 71, and valves 174 and 198 are opened. To increase the concentration of solution in holding tank 71, valves 174, 198 and 182 are opened. Both transfer pump 130 and metering pump 128 are turned on and appropriate selections made. Valves 126 and 184 are set in the five o'clock position to direct pumped fluid to blender 99.

During start up, all pumps must be primed. This is accomplished by opening the pump prime valve 202 for a period of one to three minutes, and then closed. Area washdown is accomplished by methods as set forth heretofore utilizing pump 120. Likewise, all pumps and other units may be flushed and cleaned as should be apparent to one skilled in the art.

On-site orientation and hook up begins with trailerizing or containerizing apparatus 19 for delivery and offloading at a utilization site. The unit should be located as close as possible to the solids control and/or dewatering centrifuge and/or other separating devices. Leveling of apparatus 19 is important to the accuracy of the fully automated unit described heretofore. Mud discharge line 29 is attached to the in-feed line to a selected solids separator, and should be as short as possible to prevent floc breakdown within the line, also avoiding sharp bends and loops to prevent undue shear forces within the line.

Primary electrical power (440 volts) is connected and is phase-checked by an internal phase indicator. Incoming mud feed line 21 is connected and dilution line 25 is attached to a source of dilution water. Water supply line 158 is connected to a fresh water supply and, if desired, recycle water is provided at line 159. All pumps are then primed through prime valve 202.

A water sink may be provided with the unit and should be filled in advance by setting selector switch 160 in the washdown mode and filling the sink as a precaution prior to handling acids and other potentially caustic substances. The acid connector and coagulant feed line should then be connected to metering pumps 138 and 144.

Optional units, not specifically described herein, may be provided with the apparatus, for example a pH sensor for automatic sensing of pH levels, in-line analyzer/controllers to automatically provide control signals to the acid metering pump, and other like controls, meters and sensors determined to be useful in various operations to which apparatus 19 might be applied.

Mixer, or turbulator, 43 is shown in more detail in FIGS. 6A, 6B, 7 and 8. Mixing device 43 is provided to achieve a more thorough mixing of polymer material and effluents, even at relatively low Reynolds numbers, than heretofore known. The device includes pipe/housing 225 having center section 226 and elbow 227 attached at one end of section 226 (not shown in FIG. 7). Output attachment flange 229 is provided at one end of the elbow with sample point orifice 231 being adjacent thereto. Reducer portion 233 is provided at the inlet side of housing 225 and has first injector inlet port 235 adjacent thereto.

Input mounting flange 237 is mounted at forward pipe section 239 of the mixer housing, for example by welding where metals such as stainless steel are utilized for the pipe/housing, or by other suitable techniques for firmly affixing the flange where PVC or other materials are utilized. Input flange 237 is attached to inlet pipe 45 from chemical preparation lines 35 and outlet flange 229 is connected with the input to main floc pump unit 132, for example by bolting to a mating flange attached to the pipes and pump. Second injection line connector, or port, 241 (connected with input 49 in FIG. 1) communicates through the walls of pipe/housing 225 with manifold 243 having a plurality of injection ports 245 to the interior of mixer 43 on the downstream side of the manifold.

Multiport injector and velocity increasing ring 247 is attached (for example by welding) to the inner walls of the housing. Center rod 249 is maintained in the housing on front and rear transverse flow dividers 251 and 253, respectively (the flow dividers preferably being placed at right angles to one another and attached, for example by welding, to the wall of housing 225). A series of geometrically shaped flow altering, or redirecting, elements 255, 256, 259 and 260 (made of stainless steel, PVC, or other suitable material) are attached between transversal flow dividers 251 and 253 either to center rod 249 (by welding or the like or maintained adjustably thereon) or the inner wall of housing 225. Element 260, for example, is attached (welded or the like) to the inner wall of housing 225, elements 255 and 259 are attached to center rod 249, and element 256, a radially configured flow divider, is attached by attachment pins 263 to, or through, the housing walls Elements 255 and 259 are double cone cores, element 256 is a double cone ring and element 260 is a double taper ring (as is multi-port injection and velocity increaser 247) the upstream side of each forming an angle of between 30 and 45 degrees (depending on level of turbulence desired in a particular application) with the pipe axis.

Figure 8:
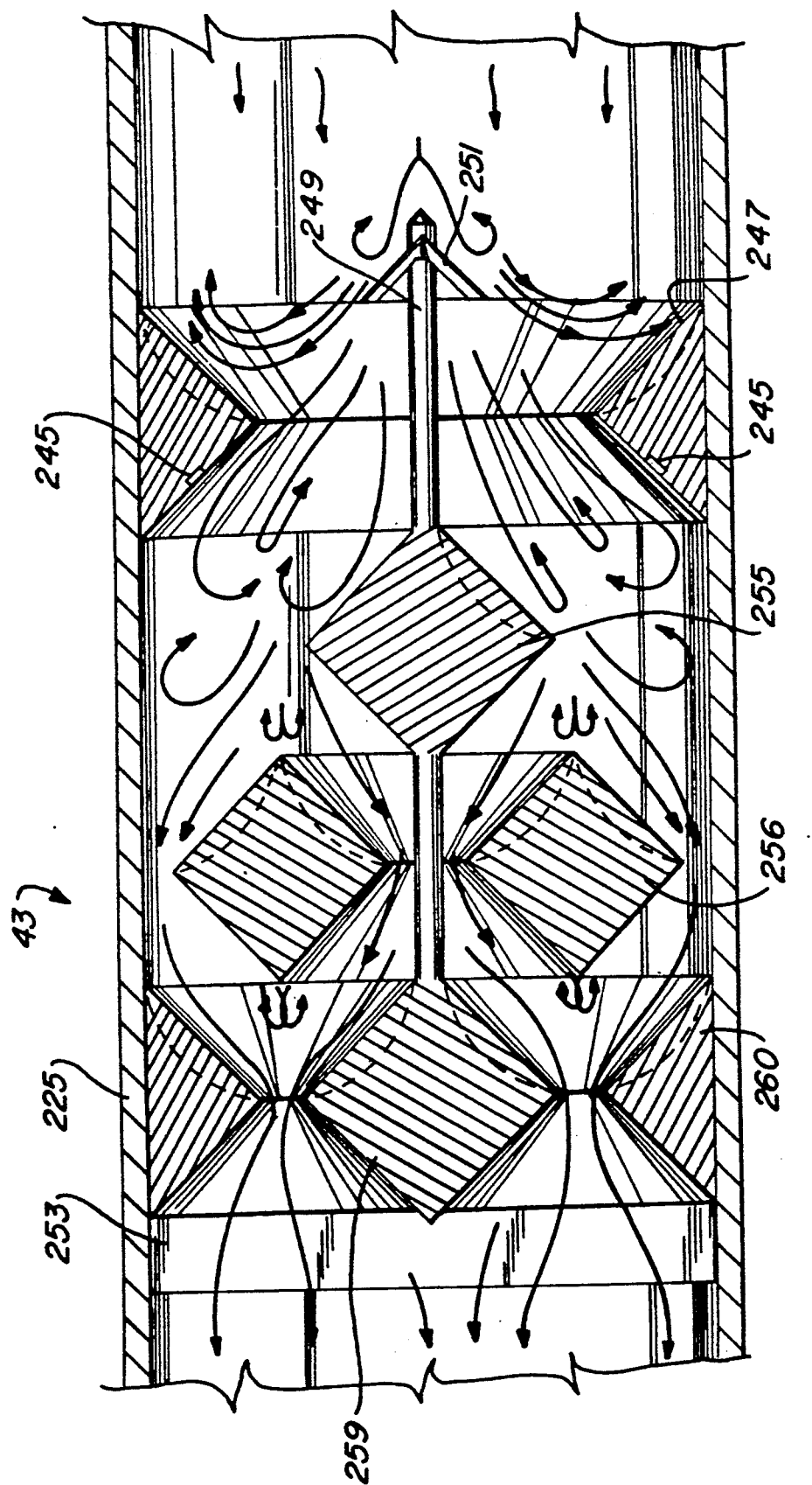
FIG. 8 is a diagrammatic illustration of the flow characteristics of effluent and injected materials through the mixing device illustrated in FIGS. 6A, 6B and 7.

The mixer provides a degree of radial mixing needed to accomplish thorough mixing between the effluents having the solid materials therein and the injected polymers within a pipe but at relatively low Reynolds numbers (generally between 2,000 and 4,000). FIG. 8 illustrates how the system of substreams and subradial flow intimately blends the fluid components flowing through the mixer and/or introduced into the mixer through ports 235 and/or 241 (and thus multi-ports 245). When the materials are injected (particularly at injector 241 which is immediate to the first blending stage) the injected fluid enters an environment of increased velocity and increased kinetic energy caused by restriction of flow at injector 247. As the fluids enter this environment, the ratio of dynamic pressure to static pressure increases dramatically and the velocity of the fluid increases. The fluid flow is then divided at element 255 and directed toward the walls of housing 255 and then redivided at element 256. The multi-course flow is reunited at elements 259 and 260 where the flow is restricted (by element 260 primarily) again directed together. The streamlined shape and relative angles of the upstream face of the flow-altering elements minimize back pressure (or back mixing) and therefore harmful shear. The total head loss in the system is dependent upon the flow rate through mixer 43, but most pressure loss will be regained downstream, especially where the system is set up in a pull through mode.

Also illustrated in FIG. 8 is one alternative design of the elements wherein the upstream face of the elements are given a slightly concave structure, the degree of concavity being solely determinable on the basis of the degree of turbulence desired and/or to be tolerated by the materials used. The concave forward faces of the various rings and cones increase the radial redirectioning of the flow through the mixer, thus increasing the turbulence within the mixer.

Various other optional features or designs could be easily incorporated into the mixer as illustrated herein, for example providing for adjustment of the elements along the outer wall or the center rod, offsetting the center rod and thus the elements to offset the channeling to further influence flow characteristics, and/or providing fewer or more flow redirecting elements and thus mixing stages.

FIGS. 9 through 11 further illustrate the polymer disperser system of this invention which includes funnel eductor 116 and disperser eductor 118. The disperser illustrated in FIGS. 9 through 11 provides a system wherein solid granulated or powdered particles are separated by air flow and carried into a liquid feed stream where the solid and liquid combine to become a homogeneous stream. Funnel eductor 116 mixes the dispersant particles with the air flow and dispersal eductor 118 serves to both mix the air/dispersant stream with the liquid feed stream and to create a vacuum which provides the air flow through funnel eductor 116.

Funnel eductor 116 includes breather cap 265 having rotatable cap 267 and stationary breather body 269, eductor body 271 having dispersant in-feed conduit connector 273 connected therewith (for example for connection to the input line from hopper/auger/feeder 115 as shown in FIG. 3), lift, or connector, hose 275, air funnel 277 and dispersant feed funnel 279. Funnels 277 and 279 each have an upper conical portion and an outlet, funnel 277 being normally fixed and feed funnel 279 preferably being adjustable axially in body 271 to accommodate particles having different sizes. Lower lift hose plug 281 connects with lift hose 275 and to eductor body 271.

Dispersal eductor 118 induces the air flow and conducts the liquid feed stream, and includes adjustment screws 283 and 285, input nozzle 287, retainer ring 289, venturi nozzle body 291, disperser body 293 and discharge pipe 295. Tangential inclined feed stem 297 is connected to disperser body 293 for connection to the fluid source (for example to incoming water line 299 from pump 120 shown in FIG. 3). The various parts may be made of suitable materials, for example piping of stainless steel, inlet connectors of Teflon, and nozzle bodies and housings made of PVC, metal or other suitable materials given the application.

O-rings 300, 302 and 303 are provided to seal the connections between venturi nozzle body 291, input nozzle 287, and disperser body 293. Venturi nozzle 305 is adjustable within the housing axially by movement of adjustment screws 283 and 285.

Air funnel 277 directs the flow of particulate solids discharged from the hopper/feeder through inlet stem 273 into a ring shaped flow around feed funnel nozzle exit 306. The vacuum created by the cyclonic flow of fluids, and the venturi effect of venturi nozzle 305 of the disperser, pulls the solid polymer particles out of funnel eductor 116 thus distributing and separating the particles in the air flow.

Air flow can be regulated at breather cap 267 by more nearly aligning or closing air intake apertures 307, 309, 310 and 311. In addition, while not specifically shown herein, funnel eductor 116 may be equipped with an adapter for an optional blower which can be used for more forceful air flow and liquid agitation at eductor 118.

Venturi nozzle 305, preferably made of Teflon, forces the flow of the particulate stream in an axial direction at its outlet port 312 inside cyclone cone wall 313 of disperser body 271. A liquid feed stream is provided through inlet port 315 of feed stem 297 and as it enters the venturi a vacuum is created. Feed stem 297 feeds the liquid tangentially to cone 316 and angled downward into the cone of disperser body 293 thus producing a cyclone flow in cone 316. Stem 297 may be tapped for a disperser body pressure gauge and threaded for pipe fittings. The overall system may be mounted in any conventional manner for use with related systems. A pressure gauge and vacuum manometer may be provided for measuring and monitoring fluid feed pressure level and the vacuum at the air/dispersant flow stream, respectively.

Since the feed stream and the dispersant stream enter the disperser body tangentially to one another, and since the fluid enters the cone shaped bore tangentially, thus maintaining a spiral flow of the fluids, prewetting potential of the airborne and separated dispersants introduced through funnel eductor 116 into disperser eductor 118 is enhanced and optimized, such as is desirable where the dispersants are polymer materials being introduced for dispersal in its liquid phase.

What is claimed is:

1. A device for mixing shear-sensitive fluid including an effluent and a treating material, said device comprising:

housing means having an inlet for receiving the effluent, input means for separately receiving the treating material, and an outlet; and a plurality of longitudinally spaced, differently configured flow altering elements positioned in said housing means adjacent to said input means between said inlet and said outlet for repeatedly altering flow of the shear-sensitive fluid to induce blending of the effluent with the treating material, each of said elements having a face positioned at an angle relative to overall flow direction of the fluid, said angle selected for limiting back pressure in said housing means, and one of said flow altering elements being a double taper ring connected to said housing means so that a manifold is defined for receiving the material from said input means and distributing the material to the interior of said housing means through a plurality of injection ports defined radially around a downstream side of said double taper ring.

2. The device of claim 1 wherein said housing means includes a forward pipe section adjacent to said inlet, a center pipe section connected with said forward pipe section and having a diameter greater than said forward pipe section, and an elbow section connected with said center section, said plurality of flow altering elements being positioned at said center section.

3. The device of claim 1 wherein said housing means includes first and second input means for receiving treating material.

4. The device of claim 1 wherein said housing means is a pipe and wherein said double taper ring has an upstream facing side connected with said pipe to form an angle of between about 30 degrees and 45 degrees.

5. The device of claim 1 wherein said plurality of flow altering elements include first and second double cone cores mounted on a mounting rod in said housing means, each of said double cone cores having an upstream facing side forming a cone meeting said mounting rod at an angle of between about 30 degrees and 45 degrees.

6. A device for mixing shear-sensitive fluids including an effluent and a polymeric treating material, said device comprising:

a pipe having an inner wall, an inlet for receiving the effluent, at least a first input port for receiving the treating material and an outlet;

first and second transverse flow dividers mounted to said inner wall of said pipe;

a mounting rod connected between said first and second transverse flow dividers;

flow restricting means mounted with said inner wall of said pipe, a manifold being defined between a face of said flow restricting means and said inner wall of said pipe for receiving the treating material from said first input port of said pipe, said manifold having a plurality of injection ports opening therefrom into said pipe;

a plurality of flow altering elements mounted on said mounting rod and each having an upstream facing side, said sides each forming a cone meeting said mounting rod at a selected angle; and a radially configured flow divider positioned in said pipe between said inlet and said outlet.

7. The device of claim 6 further comprising second flow restricting means positioned downstream from said radially configured flow divider.

8. The device of claim 7 wherein said flow restricting means, first and second transverse flow dividers, said radially configured flow divider, and said second flow restricting means each have an upstream facing side, said sides being positioned at an angle in said pipe of between about 30 degrees and 45 degrees relative to the pipe axis.

9. The device of claim 6 wherein said pipe includes a forward pipe section, an elbow section, and a center pipe section connected between said forward pipe section and said elbow section, and said center pipe section having a diameter greater than said forward pipe section, said input port being positioned at said center pipe section adjacent to said forward pipe section.

10. The device of claim 9 wherein said device further comprises a second input port positioned at said forward pipe section for receiving a treating material.

11. The device of claim 6 wherein said flow restricting means is a double taper ring having an upstream facing side meeting said pipe at an angle, and having a downstream facing side having said plurality of injection ports opening radially therearound.

12. A device for mixing a fluid with a material comprising:

a housing having first and second sections, said second section having a greater cross sectional area than said first section, an inlet at said first section for receiving the fluid, input means downstream from said inlet for separately receiving the material, and an outlet; and a plurality of flow altering elements in said second section of said housing for repeatedly altering flow of the fluid and material through said housing, said flow altering elements including a conical element and at least one of a double taper ring, a double cone core, and a radially configured flow divider.

13. The device of claim 12 wherein said flow altering elements include a manifold for receiving the material from said input means and distributing the material to the interior of said housing through a plurality of ports.

14. The device of claim 12 wherein said housing has an inner wall, and wherein said ports are at spaced locations spaced from said inner wall.

15. The device of claim 12 further comprising first and second transverse flow dividers in said housing, said flow altering elements being mounted between said flow dividers.

16. The device of claim 12 wherein said housing further includes second input means downstream from said first input means for receiving the material.

* * * * *